United States Patent
Barzuza et al.

(10) Patent No.: US 6,616,120 B2
(45) Date of Patent: Sep. 9, 2003

(54) HYDRAULIC DIAPHRAGM VALVE, FOR FLUID FLOW REGULATION

(75) Inventors: Isaac Barzuza, Petah Tiqva (IL); Ramón García Mondragon, Valencia (ES)

(73) Assignee: Plasticos Mondragon, S.A., Albuixech (ES)

(*) Notice: Subject to any disclaimer, the term of this patent is extended or adjusted under 35 U.S.C. 154(b) by 0 days.

(21) Appl. No.: 10/238,513

(22) Filed: Sep. 6, 2002

(65) Prior Publication Data

US 2003/0075701 A1 Apr. 24, 2003

Related U.S. Application Data

(63) Continuation of application No. PCT/ES01/00087, filed on Mar. 6, 2001.

(30) Foreign Application Priority Data

Mar. 7, 2000 (ES) .......................................... 200000544

(51) Int. Cl.[7] .............................................. F16K 31/26
(52) U.S. Cl. ..................................... 251/61.1; 251/331
(58) Field of Search ................................ 251/61.1, 331

(56) References Cited

U.S. PATENT DOCUMENTS

| | | | | |
|---|---|---|---|---|
| 2,963,266 A | * | 12/1960 | Boteler | 251/331 |
| 3,374,522 A | * | 3/1968 | Boteler | 251/331 X |
| 4,221,361 A | | 9/1980 | Weingarten | |
| 4,232,851 A | * | 11/1980 | Johnson | 251/61.1 |
| 5,127,430 A | * | 7/1992 | Powers et al. | 251/331 X |
| 5,327,937 A | * | 7/1994 | Kato et al. | 251/331 X |
| 5,363,875 A | | 11/1994 | Vollmer | |
| 5,383,646 A | * | 1/1995 | Weingarten | 251/61.1 |
| 5,909,747 A | * | 6/1999 | Schieber | 251/331 X |
| 6,095,484 A | * | 8/2000 | Frenkel | 251/61.1 |
| 6,109,296 A | * | 8/2000 | Austin | 251/61.1 X |

FOREIGN PATENT DOCUMENTS

| | | |
|---|---|---|
| DE | 41 06 071 A1 | 9/1992 |
| DE | 198 26 610 A1 | 12/1999 |
| EP | 0 320 700 | 6/1989 |
| ES | WO-01/66916 A2 * | 9/2001 |

* cited by examiner

*Primary Examiner*—Gene Mancene
*Assistant Examiner*—Eric Keasel
(74) *Attorney, Agent, or Firm*—Katten Muchin Zavins Rosenman

(57) ABSTRACT

The "Improved hydraulic diaphragm valve, for fluid flow regulation" which constitutes the object of this Patent, contains a semi-conical deflector (2) with an open and flat upper face (3), its perimeter being an isosceles triangle and its cross section equal to that of the valve passage, the semi-cone (2) and the triangle (3) being oriented towards the intake of the fluid.

The diaphragm (4) is seated on the flat section (3) pressed by the fluid contained in the chamber formed by the cover (5) and the diaphragm (4); whilst by draining the fluid from the chamber, the intake pressure lifts the diaphragm (4) off its seating.

Shutting or reducing flow is produced in the upstream direction, and opening or increasing flow, downstream.

3 Claims, 4 Drawing Sheets

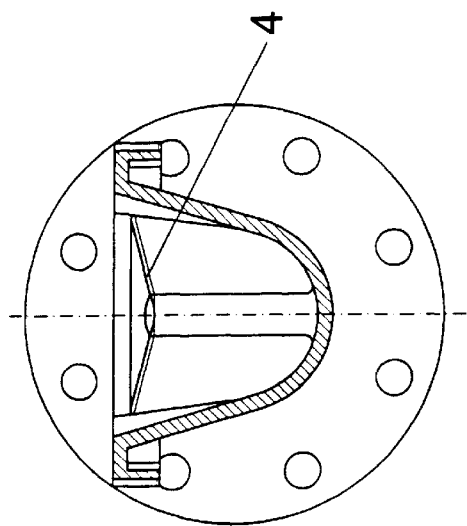
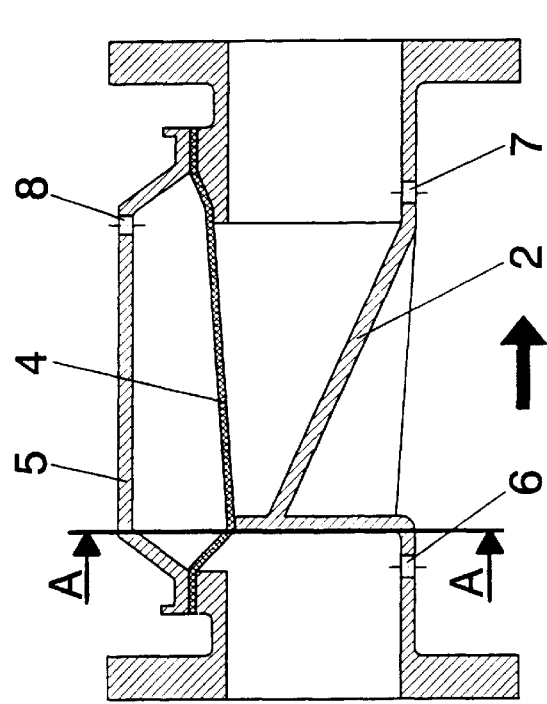
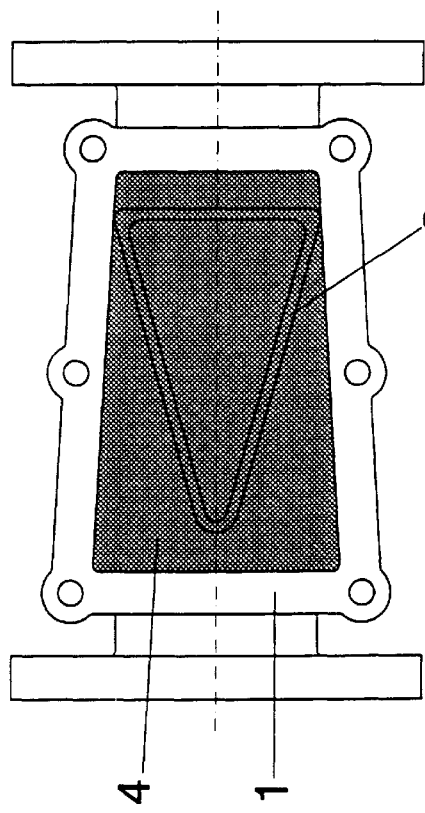

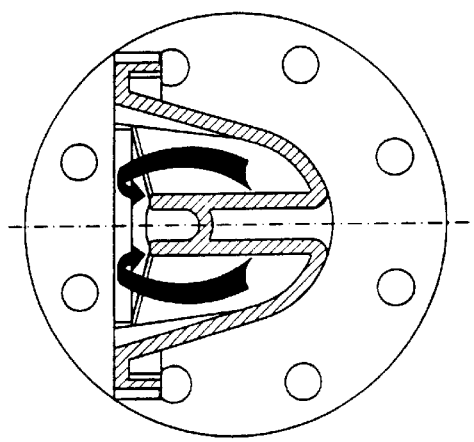
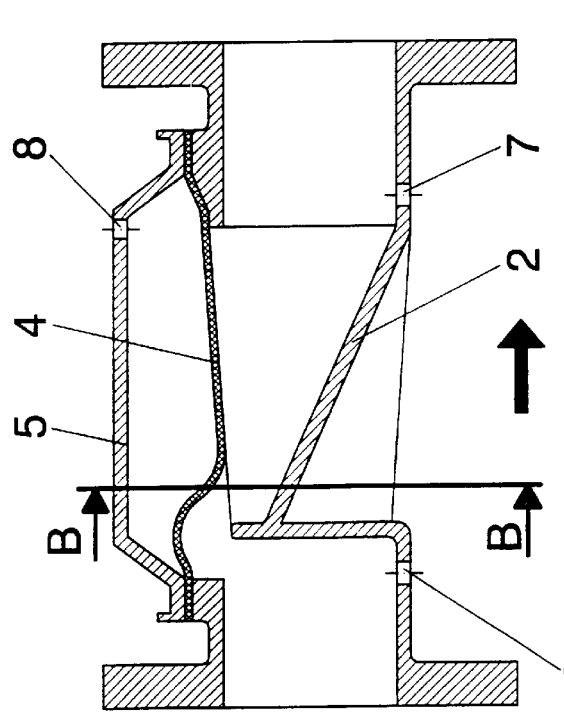
FIG.4
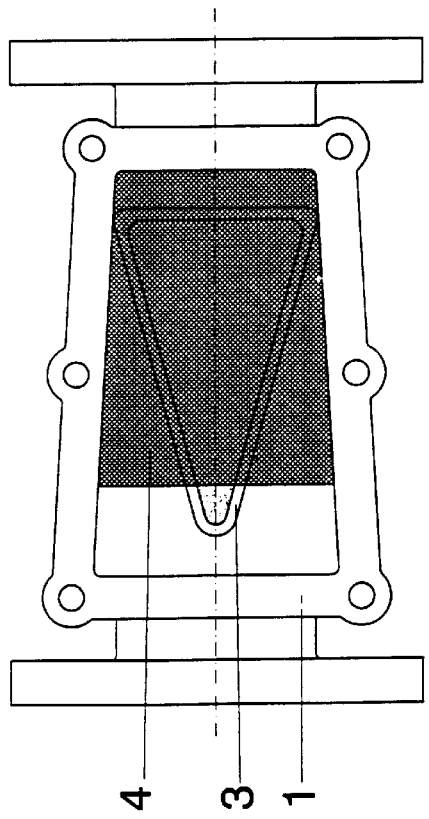
FIG.5
B-B
FIG.6

C-C

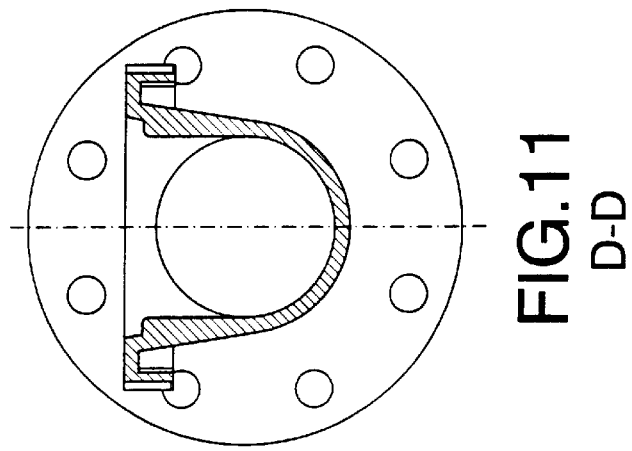
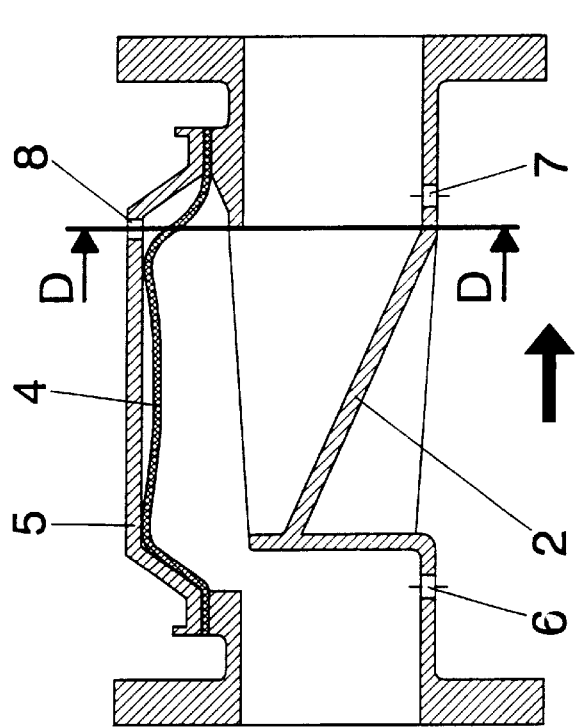
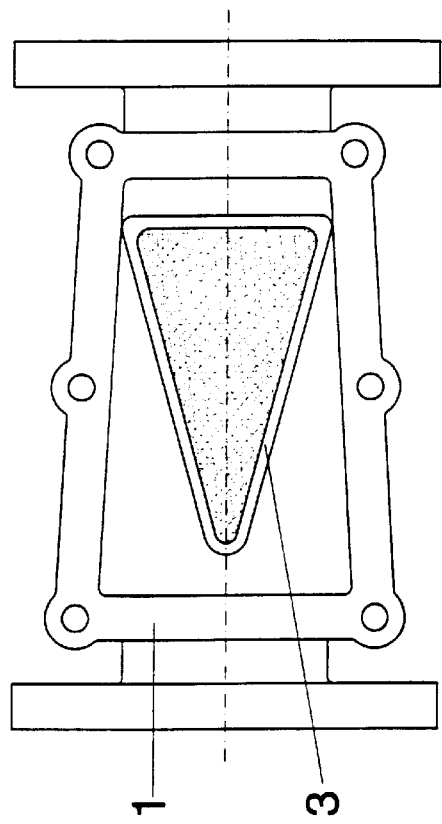

HYDRAULIC DIAPHRAGM VALVE, FOR FLUID FLOW REGULATION

This application is a continuation of PCT/ES01/0087, filed Mar. 6, 2001.

OBJECT OF THE INVENTION

The present invention relates to a hydraulic. diaphragm valve for regulating the flow of fluids, which has been improved in determined structural features thereof, for the purpose of achieving optimal regulation of the flow of fluid passing through it. To this end, the pertinent valve body contains a semi-conical deflector element with its upper part terminated in an open flat face the perimeter of which has the form of an isosceles triangle, the cross section of this being approximately equal to that of the valve passage according to its nominal diameter, because the passage of water through the valve takes place within said triangular section. When the valve is fully open, the streamlined form of the semiconical deflector favours the circulation of the fluid, both in the intake and in the discharge area, avoiding the occurrence of turbulence in the flow and reducing the headlosses in the valve. The valve also includes diaphragm flat in shape in its seating zone, adapting to the sides of the discharge section in order to achieve fluid leak-tightness when it is partially or totally shut.

BACKGROUND OF THE INVENTION

In the most commonly employed design of known hydraulic diaphragm valves, the flexible diaphragm itself takes the form of a hemispherical or spherical shell which, for carrying out the shutting action, is seated on an area shaped like a segment of a circumference.

The shutting of the valve is carried out by injecting water under pressure into the chamber formed by the cover of the valve and the diaphragm itself, the leak-tightness of the seal being assured, in some cases, by means of one or more springs located in said chamber, which compress the diaphragm against its seating, even when the fluid pressure is low.

The opening of the valve is carried out by draining the water held in the chamber, thereby permitting the diaphragm to be deformed, leaving the fluid passage free.

The operation of the valve described here above, corresponds to the valve operating in full-on or full-off mode. For its utilisation as a regulator, in a known process it is usually fitted with pilot valves (small hydraulic valves) which, by means of sensors that compare the pressure of the fluid at the valve outlet with the pilot setting, cause the partial filling or emptying of the valve chamber, communicating it with the intake or the outflow of the fluid respectively, whereby the diaphragm adopts intermediate positions between that of totally open or totally shut.

However, the behaviour of these valves as regulators, is only acceptable within a range of flow rates around the nominal value, since when the flow rates conveyed are less than nominal, the equilibrium position of the diaphragm is not attained, which leads to serious oscillations in the pressure it is intended to regulate, because the variation in the passage cross section takes place in an alternating manner that is frequent, fast and abrupt.

DESCRIPTION OF THE INVENTION

The aim of the invention which constitutes the object of this Patent, consists in eliminating the problems of deficient regulating capacity of known hydraulic diaphragm valves, as described here above, by means of an improved design of the shutting mechanism, which optimises its hydraulic properties.

The body of the valve contains a semi-conical deflector element, with its axis arranged in the longitudinal direction, the upper part of which has an open flat face and the perimeter of which has the shape of an isosceles triangle of straight or mixed sides, the cross section of the latter being approximately equal to that of the valve passage according to its nominal diameter, because the passage of water through the valve takes place within the triangular section.

The vertices of the semi-cone and of the triangular opening are oriented towards the intake part of the fluid to the valve.

When the valve is fully open, the streamlined form of the semi-conical deflector favours the circulation of the fluid, both in the intake and in the discharge zone, avoiding the occurrence of turbulence in the flow and reducing the loss of head in the valve.

The diaphragm is flat in form in its seating zone, adapting to the sides of the discharge section in order to achieve the fluid leak-tightness when partially or totally shut; and it is preferentially fabricated with an elastomer of sufficient flexibility to permit the continual deformations that its operation requires, it being possible to incorporate internal reinforcement if deemed necessary for the working pressure of the valve.

The working of the valve as an operational element, in a "full-on or full-off" regime, is as follows:

When the cavity comprised between the diaphragm and the cover of the valve (that is, its chamber) is filled with fluid at a pressure equal to or greater than the intake level, valve shut-off takes place, since the diaphragm is applied to its seating on the flat face of the semi-cone, covering the triangular opening.

On the other hand, when the chamber of the valve is totally drained, its complete opening is produced, since the diaphragm is deformed leaving the totality of the triangular passage section free, which is equivalent to that of the discharge pipe, of the nominal diameter of the valve.

The operation of the valve as a fluid flow regulator is the following:

At an intermediate point of the regulation process, the valve shall be partly open, the chamber partly full of fluid and the diaphragm deformed with a double-curve profile.

As the intake pressure is always greater than the discharge pressure in order that the fluid flows in the direction planned, the pressure of the fluid contained in the chamber shall be intermediate between both, and shall tend to apply the diaphragm against its seating, this force being the greater as the larger is the actuating area, for which reason the area of the diaphragm that shall be applied initially against its seating shall be that corresponding to the base of the triangular opening, and the passage section which is left free shall be that corresponding to the vertex of said opening.

Reciprocally, the intake pressure shall tend to lift the diaphragm from its seating starting with the zone of least resistance, that is, with the vertex of the triangular discharge section.

Thus, the actuation of the valve in shutting or reduction of flow shall be from back to front, starting with the higher flow rates; and the reverse in the process of opening or increase of flow.

The automatic regulation of the fluid intake and discharge pressures, which leads to automation in the actuation of the valve, is achieved by taking their respective values which are detected by a pilot valve which acts through its sensor as control and regulation organ.

In any case, the situations of hydrodynamic equilibrium assumed and described above, are produced indistinctly with passage sections close to the outermost vertex of the triangular flat face or close to its base; that is, with flow-through rates of magnitude less than the nominal value for the valve, or with flow rates close to said nominal value, respectively.

In this way, the valve can operate effectively as a regulator, in much wider flow ranges than those of conventional valves, and avoid the problems of pressure fluctuations which the latter present.

DESCRIPTION OF THE DRAWINGS

To complete the description being made and for the purpose of assisting in a better understanding of the characteristics of the invention, in accordance with a preferred practical embodiment thereof, attached hereto as an integral part of said description, is a set of drawings in which, by way of illustration and not restrictively, the following is shown:

FIGS. 1 to 12 show a sequence in the opening process of the valve, from full-off to full-on: of these, FIGS. 1, 2 and 3 correspond to the valve shut off.

FIGS. 4, 5 and 6 correspond to the valve slightly open, with passage section through the vertex of the triangular discharge section.

FIGS. 7, 8 and 9 correspond to the valve opening passage to a medium flow.

FIGS. 10, 11 and 12 correspond to the valve fully open, with the passage section equal to that of the discharge pipe.

Figure 7:
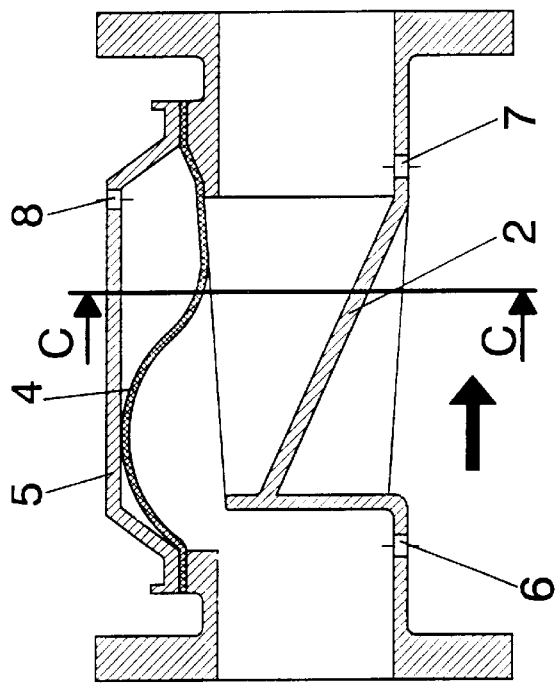

With respect to its representation;

FIGS. 1, 4, 7 and 10, are longitudinal cross sections of the valve, each on an axial vertical plane.

Figure 8:
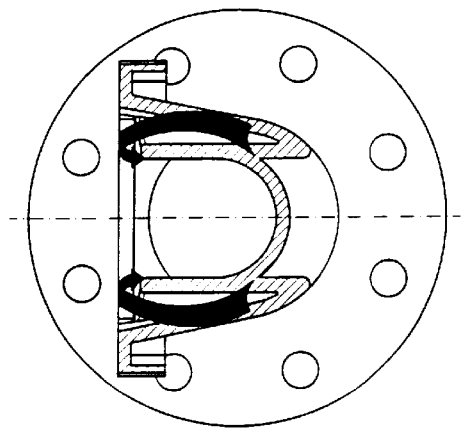

FIGS. 2, 5, 8 and 11, are transversal cross sections of the valve without cover on the planes whose traces are indicated respectively as A—A (FIG. 1), B—B (FIG. 4), C—C (FIG. 7) and D—D (FIG. 10).

Figure 9:
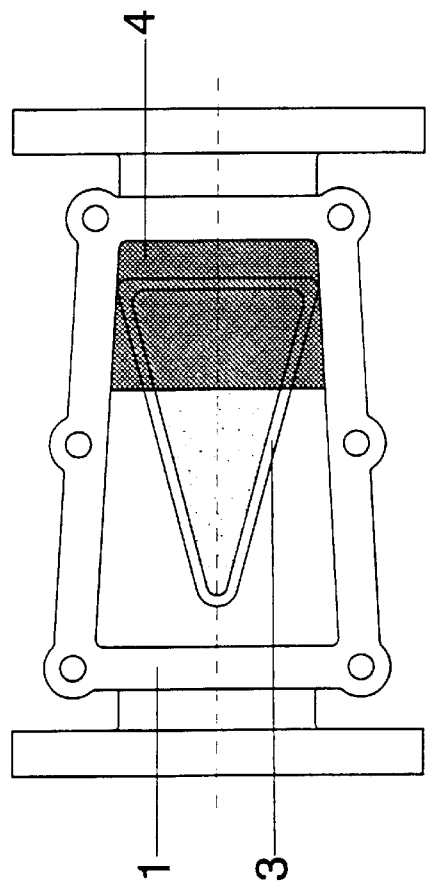

FIGS. 3, 6, 9 and 12, are conventional plan views of the valve without cover, and with the diaphragm cut on the plane of its upper face.

PREFERENTIAL EMBODIMENT OF THE INVENTION

In order to demonstrate clearly the nature and the scope of the beneficial application of the "Improved hydraulic diaphragm valve, for fluid flow regulation" which constitutes the object of the invention, a description is furnished below of its structure and operation, making reference to the drawings which, through representing a preferential embodiment of said object, by way of information, must be considered in their broadest sense and not as restricting the application and the content of the invention.

Its body (1) contains a semi-conical deflector element (2), with its axis parallel to the longitudinal axis of the valve, there being on the upper part of said element (2) a flat open face (3) the perimeter of which has the shape of an isosceles triangle of cross section approximately equal to that of the valve passage in accordance with its nominal diameter, in order to facilitate the conveyance of fluid when the valve is fully open, since the flow passes through the triangular section.

The vertex of the semi-cone (2) and consequently the outermost vertex of the triangular opening (3), are oriented towards the fluid intake part to the valve.

The flexible diaphragm (4) adopts a flat shape in the zone where it is seated, adapting itself to the sides of the triangular passage section in order to achieve fluid leak-tightness when it is partially or totally shut, pressed against its seating by the fluid contained in the chamber formed by the cover (5) and the diaphragm (4).

The opening of the valve is produced by draining the fluid from said chamber, whereby the incoming fluid pressure pushes the diaphragm (4) separating it from its seating and facilitating its discharge through the triangular passage section of the semi-conical deflector (2).

As a consequence of its design, the actuation of the valve in shutting or reducing flow shall be from back to front (upstream), starting with the higher flow rates; and the reverse (downstream) in the opening process or increasing flow.

On its body the valve has orifices each of which serves for connection purposes when employing pilot valves or other devices. Said orifices are situated on the intake part (6) and discharge part (7), and also on the chamber (8). When the valve is used as an automatic regulator, said orifices are connected in an adequate manner to the regulator pilot.

What is claimed is:

1. Improved hydraulic diaphragm valve, for fluid flow regulation, which includes a valve body with a flexible diaphragm by means of which the opening, shut-off or partial passage through the valve body is established for the fluid, is characterised in that said body (1) of the valve includes a semi-conical deflector element (2), with its axis parallel to the longitudinal axis of the valve, there being on the upper part of said deflector a flat open face which determines an opening for passage of the fluid, the perimeter of which has the shape of an isosceles triangle of cross section approximately equal to that of the valve passage according to its nominal diameter, in order to facilitate the circulation of the fluid when the valve is fully open; it having been foreseen that the vertex of the semi-conical deflector (2) and therefore the outermost vertex of the triangular opening (3), are oriented towards the intake part of the fluid to the valve.

2. Improved hydraulic diaphragm valve, for fluid flow regulation, in accordance with claim 1, characterised in that the flexible diaphragm (4) adopts a flat form in the zone where it is seated, adapting itself to the sides of the section of the triangular opening for passage of fluid, in order to achieve fluid leak-tightness when partially or totally shut, said flexible diaphragm (4) being pressed against its seating by the fluid contained in the chamber formed by a cover (S) of the body (1) and the flexible diaphragm (4) itself; with the particularity that the opening of the valve is produced by draining the fluid from said chamber, whereby the intake pressure of the fluid pushes the diaphragm (4) separating it from its seating and facilitating its discharge through the triangular opening (3) of the semiconical deflector (2).

3. Improved hydraulic diaphragm valve, for fluid flow regulation, according to claim 1, characterized in that the actuation of the valve in closing or reducing flow is carried out upstream, starting with the higher flow rates; and downstream in the process of opening or increasing flow.

* * * * *